United States Patent [19]
Hulshof et al.

[11] Patent Number: 5,583,400
[45] Date of Patent: Dec. 10, 1996

[54] DEFLECTION CORRECTION

[75] Inventors: Jozef J. M. Hulshof; Henricus L. Simons; Dirk J. A. Teuling, all of Eindhoven, Netherlands

[73] Assignee: U.S. Phillips Corporation, New York, N.Y.

[21] Appl. No.: 546,862

[22] Filed: Oct. 23, 1995

[30] Foreign Application Priority Data

Oct. 25, 1994 [EP] European Pat. Off. ............. 94203099

[51] Int. Cl.$^6$ .................................................. H01J 29/56
[52] U.S. Cl. ............................................. 315/371; 348/806
[58] Field of Search .............................. 315/371, 368.21, 315/368.22; 348/806, 807

[56] References Cited

U.S. PATENT DOCUMENTS

| | | | |
|---|---|---|---|
| 4,668,897 | 5/1987 | Haferl | 315/371 |
| 4,682,085 | 7/1987 | Haferl et al. | 315/371 |
| 4,687,972 | 8/1987 | Haferl | 315/371 |
| 4,845,409 | 7/1989 | Oliver | 315/371 |
| 4,961,030 | 10/1990 | Ogino et al. | |
| 5,034,664 | 7/1991 | Fernsler et al. | 315/370 |
| 5,111,120 | 5/1992 | Haferl | 315/393 |

FOREIGN PATENT DOCUMENTS

| | | | |
|---|---|---|---|
| 0454008A2 | 10/1991 | European Pat. Off. | H04N 32/33 |
| 4138494A1 | 5/1993 | Germany | H04N 3/23 |

*Primary Examiner*—Theodore M. Blum
*Attorney, Agent, or Firm*—Edward W. Goodman

[57] ABSTRACT

In the market, there is a tendency towards picture tubes with a super flat screen. Due to the flat screen, it is becoming increasingly difficult to meet the even tighter specification on North/South raster distortion (N/S distortion), the tighter specification being caused by a growing importance of text display and high resolution displays. A deflection correction circuit is provided which compensates for a N/S distortion by inducing a correction current (Icv) through a vertical deflection coil (Lv). The correction current (Icv) can be injected in the vertical deflection coil (Lv) via an injection transformer (Ti) coupled in series with the vertical deflection coil (Lv). The injection transformer (Ti) is driven via an output stage (3) by a waveform generator (1,2). The waveform generator (1,2) generates a voltage waveform (M) built up out of substantially straight line sections. The deflection coil (Lv) integrates the voltage waveform (M) into a current waveform (Icv) having substantially parabolic sections. Such an inexpensive and flexible deflection correction circuit can be used to compensate for top/bottom and/or seagull N/S distortion, or for correction of convergence distortions. The deflection correction circuit can be a discrete or an integrated circuit.

13 Claims, 10 Drawing Sheets

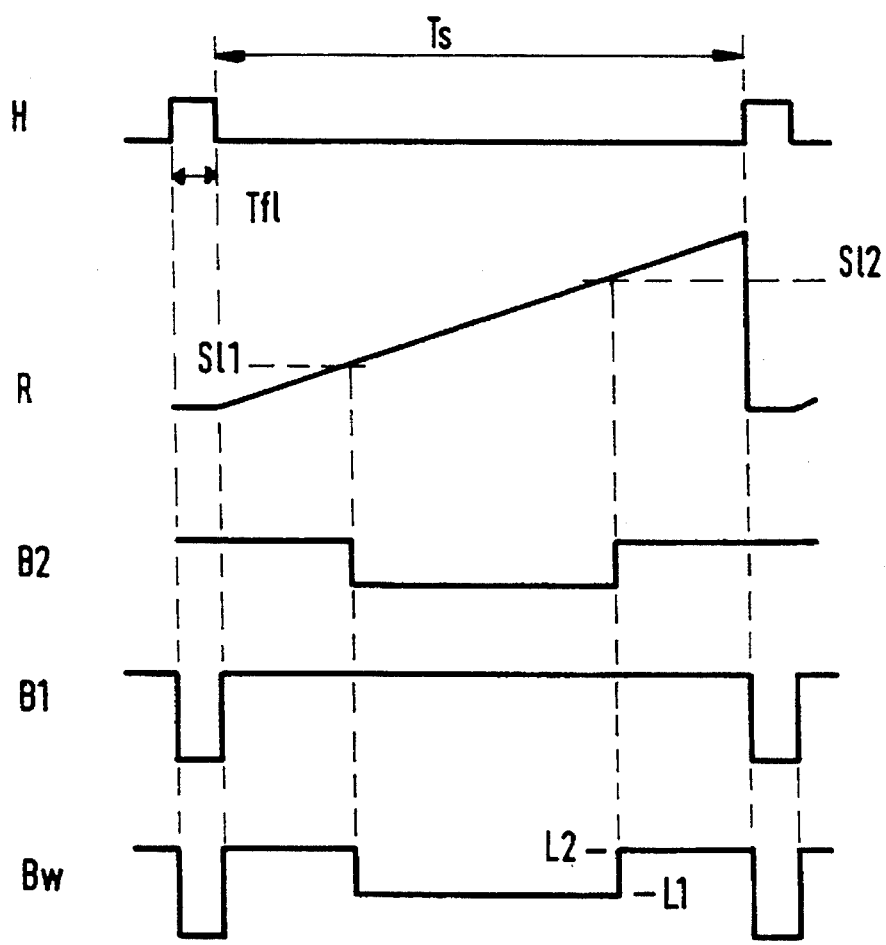

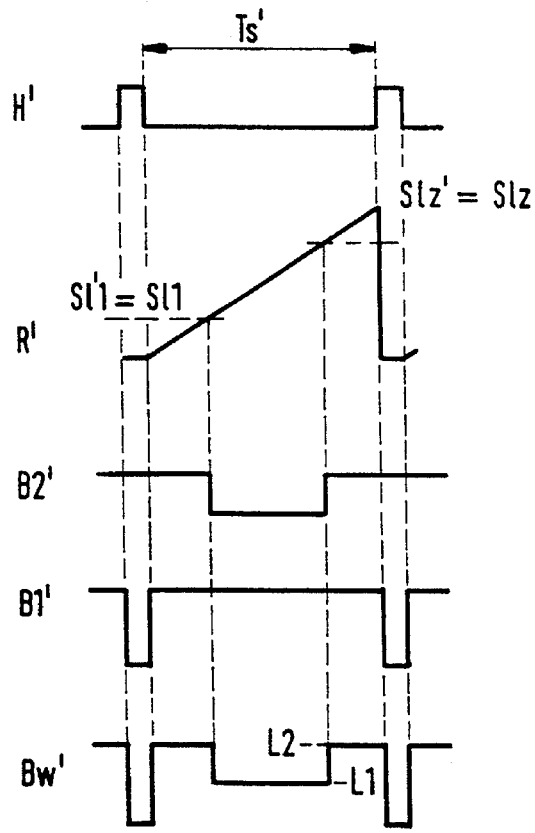
FIG.8f
FIG.8g
FIG.8h
FIG.8i
FIG.8j
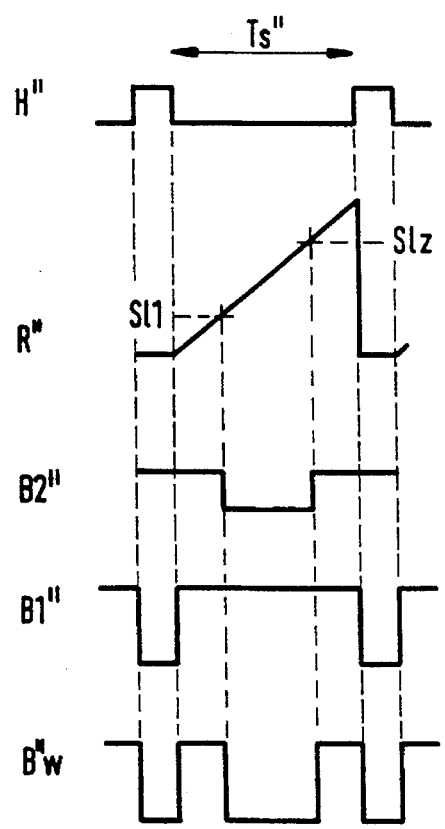
FIG.8k
FIG.8l
FIG.8m
FIG.8n
FIG.8o

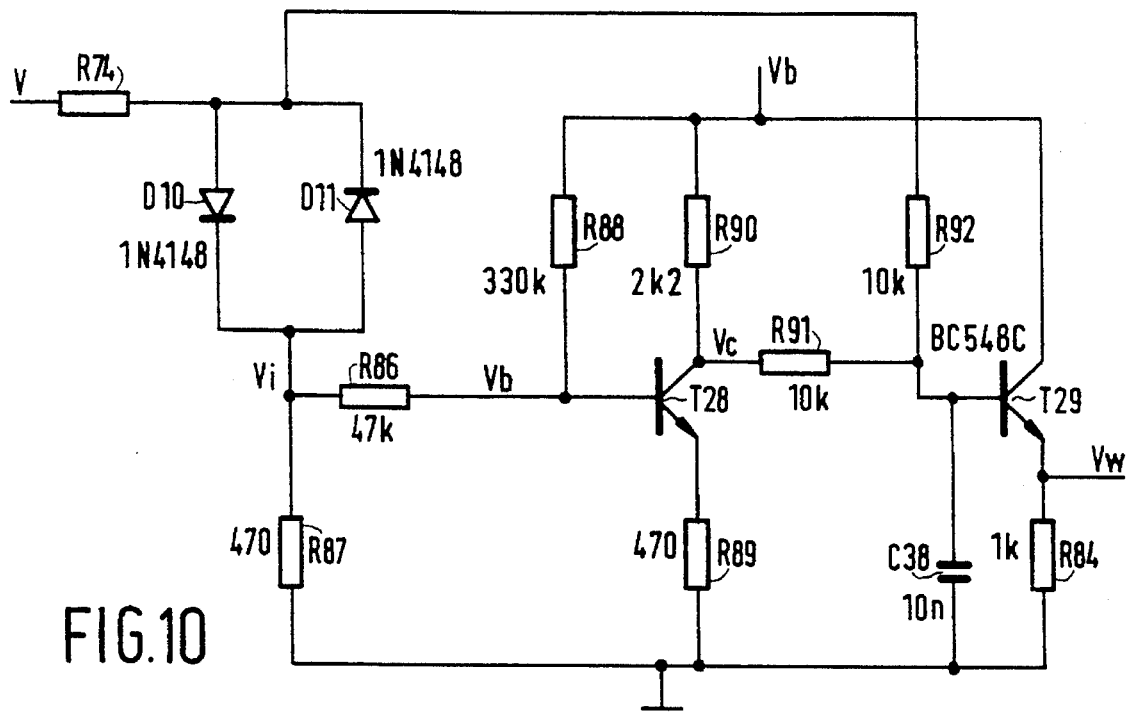
FIG.10
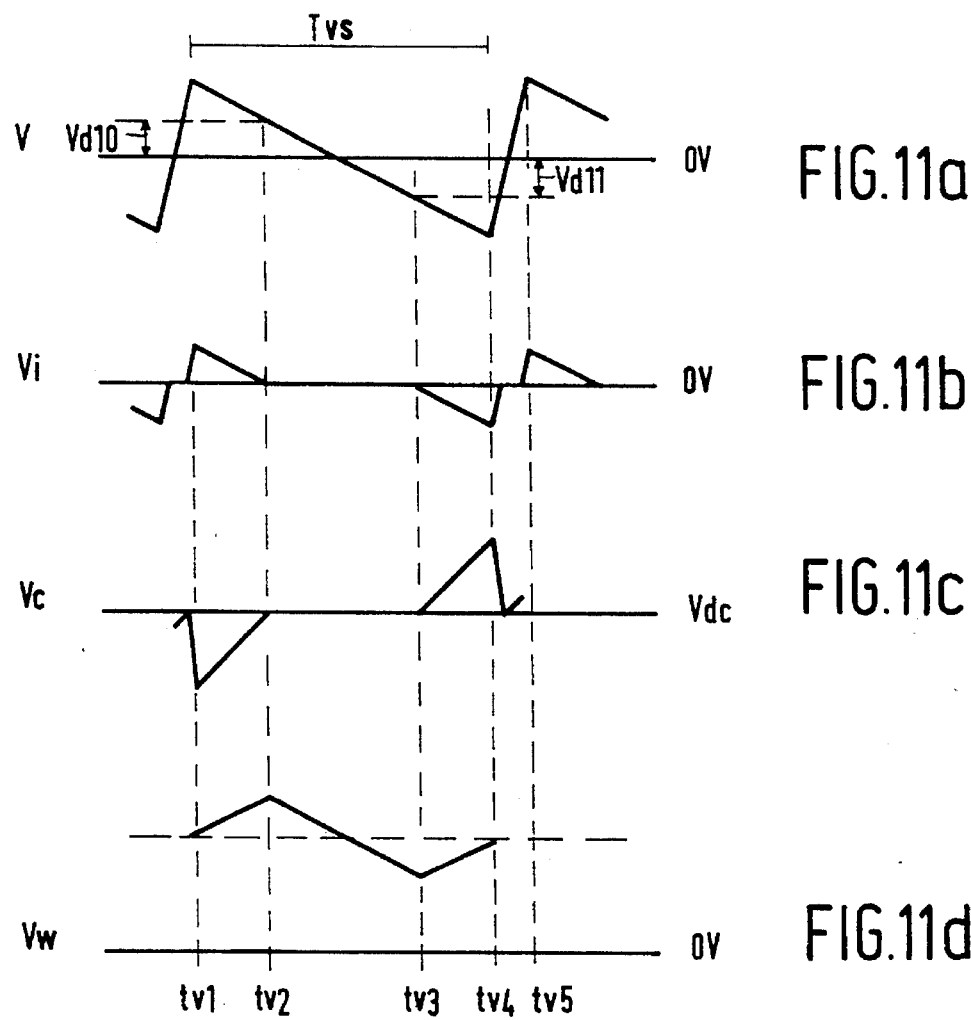
FIG.11a
FIG.11b
FIG.11c
FIG.11d

DEFLECTION CORRECTION

BACKGROUND OF THE INVENTION

1. Field of the Invention

The invention relates to a method of correcting a deflection distortion of a picture tube by developing a correction current through a deflection yoke, the method comprising the steps of: generating a periodical waveform being synchronized to a position signal, and coupling the periodical waveform as a correction voltage to the deflection yoke to develop the correction current.

The invention also relates to a deflection correction circuit for correcting a deflection distortion of a picture tube, the correction circuit comprising: means for generating a periodical waveform from a position signal, and means for coupling the periodical waveform to a deflection yoke as a correction voltage to develop a correction current in the deflection yoke.

The invention also relates to a picture display apparatus comprising such a deflection correction circuit.

Such a deflection distortion correction may be applicable in a display system comprising a picture tube. More particular the invention is able to correct for high order deflection distortions such as North/South and convergence errors.

2. Description of the Related Art

In the market, a tendency can be observed towards more restricted specifications on N/S (North/South) raster distortion visible on a screen of a picture tube. In the ideal case, an electron beam is deflected to produce on the screen of the picture tube, a completely rectangular raster being free from non-linearity. In practice, on certain picture tubes, a specific raster distortion error can be observed called N/S seagull raster distortion. The N/S seagull distortion can be noticed as a bending of horizontal lines having more or less the shape of a gull wing. In general, the bending of the horizontal lines appears in vertical direction around the center of a line: on the upper part of the screen in downward direction, on the lower part of the screen in upward direction. If this N/S seagull raster distortion in a tube/yoke combination is too large, it can be compensated by a vertical correction current through the vertical deflection coil.

U.S. Pat. No. 4,845,409 discloses a N/S raster correction system in which a N/S seagull raster correction waveform is generated by a tuned circuit comprising a coil and a capacitor. The tuned circuit resonates at approximately twice the horizontal deflection frequency. Further, the known N/S raster correction circuit generates: a sawtooth waveform to compensate for N/S pincushion raster distortion, and a parabola waveform to compensate for N/S phase errors. The N/S seagull correction waveform, the sawtooth waveform and the parabola waveform are added together to supply a horizontal correction waveform having a repetition frequency equal to the horizontal deflection frequency. The horizontal correction waveform is multiplied by a vertical waveform to generate a composite correction waveform having the shape of the horizontal correction waveform and an amplitude depending on the vertical waveform to obtain a correction being dependent on the vertical position on the screen. The composite waveform is amplified and injected as a correction voltage in series with the vertical deflection coil. The correction voltage is integrated by the vertical deflection coil to obtain the vertical correction current for compensating the N/S distortions. The known N/S raster correction circuit generates the N/S seagull correction with a tuned circuit. A first drawback of using a tuned circuit is that the N/S seagull correction has a fixed sinusoidal shape which may not be able to compensate, to the extent desired for a non sinusoidal N/S seagull distortion of certain picture tubes. Another drawback of the tuned circuit is that the shape of the N/S seagull correction can only be changed by altering the resonance frequency of the tuned circuit, which involves cumbersome adjustment or replacement of the components used in the tuned circuit. These sinusoidal and non-sinusoidal N/S distortions are referred to as high-order N/S corrections.

SUMMARY OF THE INVENTION

It is, inter alia, an object of the invention to compensate for deflection distortions on the picture tube screen with improved performance by providing a flexible deflection correction method and a circuit for generating a deflection correction current through a yoke influencing the deflection.

To this end, a first aspect, in accordance with the invention, is characterized in that the step of generating the periodical waveform comprises the step of: generating substantially straight line sections each having a certain slope and a certain duration, wherein a starting point of a next straight line section coincides with an end point of a preceding straight line section, and wherein the periodical waveform comprises more than one straight line section during a relevant scan period for obtaining the correction current comprising a chain of parabola sections. A second aspect of the invention provides a correction circuit characterized in that the means for generating the periodical waveform comprise: means for generating substantially straight line sections, wherein a starting point of a next straight line section coincides with an end point of a preceding straight line section, and wherein the periodical waveform comprises more than one straight line section during a relevant scan period for obtaining the correction current comprising a chain of parabola sections. A third aspect of the invention provides a picture display apparatus comprising such a deflection corrections circuit.

The periodical waveform is composed of a chain of substantially straight line sections, is synchronized to a position signal (for example, a line synchronization signal or a line flyback pulse), and has a repetition frequency equal to the relevant deflection frequency. Each straight line section has a certain duration and a certain slope. The end point of a straight line section coincidents with a starting point of a succeeding line section. The periodical waveform is coupled, as a correction voltage, to a deflection yoke. The deflection yoke may comprise any coil influencing the position on the screen of the picture tube. The chain of straight line sections of the correction voltage gives rise to a correction current containing a chain of parabola sections through the deflection yoke by the integrating property of this deflection yoke. To be able to correct for high-order deflection distortions at least two straight line sections need to be present in a relevant scan interval. The position of the straight line sections with respect to the position signal and the duration of the straight line sections determine the shape of the correction current. The amplitude of the periodical waveform determines the amount of correction current. The number of straight line sections needed in a scan interval depends on the required accuracy of the correction current. Hence, the correction method and circuit according to the invention is able to compensate with high accuracy, for position errors on a picture tube screen in N/S and east/west (E/W) direction. N/S errors or vertical convergence errors (both displacements on the picture tube screen in the vertical direction) can be compensated by generating the periodic waveform with a relevant scan period, equal to a line period if the picture tube is scanned in the usual way by horizontal lines (the line scan, in horizontal direction) which succeed each other in vertical direction (the field scan, in vertical direction). If the picture tube is scanned in the usual way as described above, horizontal convergence errors can be compensated by generating the periodic waveform with a relevant scan period equal to a field period. If the picture tube is scanned in a so called transposed way by vertical lines (the line scan, in vertical direction) which succeed each other in horizontal direction (the field scan, in horizontal direction) the N/S errors or vertical convergence errors can be compensated by generating the periodic waveform with a relevant scan period equal to a field period. Horizontal convergence errors can be compensated by generating the periodic waveform with a relevant scan period equal to a line period if the picture tube is scanned in the transposed way. The deflection yoke may comprise an arrangement of several coils, for example, a four-pole and a six-pole yoke to compensate for convergence errors.

The cited prior art can only compensate, with high accuracy, for high-order N/S raster distortions having a sinusoidal shape. The straight line sections of the invention can be generated by: a microcomputer, discrete hardware, or integrated hardware. The invention can easily adapt the shape of the correction current, for example, by control via a bus (for example, I2C-bus), especially in case of an integrated solution. In the prior art, the coil used in the tuned circuit needs to be adjusted by hand, which is a cumbersome operation. Furthermore, a tuned circuit is far more sensitive to misalignment and temperature drift.

The yoke influencing the deflection can be a field deflection coil used for deflecting a picture on the picture tube in the field direction. In this case, the correction current in the field deflection coil can be obtained, for example, by injecting a correction voltage via an injection transformer arranged in series with the field deflection coil.

In principle, the substantially straight line sections are straight and are positioned such that the parabola sections are positioned symmetrically around the center of the relevant scan to compensate for symmetrical deflection distortions. If the deflection distortions are not symmetrical (for example, the case if the matching of a deflection unit and the picture tube is not optimal) it might by needed to use not exactly straight line sections, which might be positioned asymmetrical.

As embodiment of the invention features the substantially straight line sections being generated by integrating a chain of levels in a block waveform. Such chain of levels, or a composition of pulses can be generated in a simple way.

Another embodiment of the invention features a block waveform being generated having, during the relevant scan interval, three levels positioned symmetrically around the center of the scan interval to compensate in a cheap way for a symmetrical distortion, such as, for example, a symmetrical N/S seagull distortion. The levels are generated by adding a first pulse, which is active during the relevant flyback period and which has a first amplitude, to a second pulse, which is active during part of the relevant scan period and which has a second amplitude. The second pulse is generated by first integrating the first pulse with respect to its mean level into a sawtooth waveform, then integrating the sawtooth waveform with respect to its mean level into a parabola waveform. In this way, the parabola waveform is symmetrical with respect to the center of the scan period, as is needed if a symmetrical distortion has to be corrected. The second pulse is generated by slicing the parabola voltage with a slicing level. By integrating the block waveform with respect to its mean level, a correction waveform is generated wherein the end point of a line section coincidents with a starting point of a succeeding line section automatically. The shape of the correction current can be adapted by controlling the slicing level, or by changing the amplitude of at least one of the pulses.

Another embodiment has the feature in which a ramp signal is generated. The ramp signal is synchronized to the position signal. A pulse can be generated by slicing the ramp signal with two different slicing levels. The position of the pulse in the scan period depends on the values of the slicing levels. The block waveform comprises two levels during the scan period if one such pulse is generated. The shape of the correction waveform can be adapted by changing the slicing levels or by controlling the amplitude of the pulse. To be able to supply a more accurate correction, it is possible to generate more than one pulse by using more than two slicing levels. In this case it is possible to control the amplitude of each of the pulses separately. This embodiment has the advantage that is able to generate a correction waveform that can very easily be adapted to correct high order deflection distortions with high accuracy.

A simple embodiment supplies a block waveform comprising two added pulses. A first, easy adaptable, pulse is an active part of the scan period, and a second pulse is derived from a flyback pulse.

An embodiment of a method in accordance with the invention is characterized in that the step of generating the periodical waveform comprises the further step of generating a control signal having a value indicative of a repetition frequency of the position signal, and in that the step of integrating the periodical block waveform is adapted to substantially stabilize an amplitude of the correction current in response to the control signal. In a display apparatus able to cope with different scan rates (for example, computer monitors), the periodical waveform needs to be adapted to obtain the same amount of correction on the picture tube. The correction of the position on the picture tube depends on the shape and the amplitude of the correction current through the deflection yoke. The correction current causes the same displacement on the screen if its amplitude stays equal at different scan frequencies, and if its shape is scaled in time in accordance with a change of the duration of the scan period. The correction current is obtained by integrating the correction voltage with the deflection yoke. This integrating action of the deflection yoke causes the amplitude of the correction current to be proportional with the scan period. To compensate for this integrating action of the deflection yoke, an integrator for integrating the block waveform needs to be adapted to generate a periodical waveform having an amplitude being inversely related to the scan period. If the values of the levels of the block waveform do not depend on the scan frequency, two corrections need to be performed. First, the constant value of the levels has to be corrected by adapting the amount of integration of the integrator inversely in response to the scan period to obtain a periodical waveform having a constant amplitude. Secondly, the amount of integrating action of the deflection yoke has to be compensated by again adapting the amount of integration of the integrator inversely in response to the scan period. If the values of the levels of the block waveform are already inversely related to the scan period, only the integrating action of the deflection yoke needs to be compensated by adapting the amount of integration of the integrator inversely in response to the scan period. In this way, a high order deflection distortion can be compensated in display apparatus having different scan frequencies.

Instead of adapting the amount of integration, it is also possible to adapt the integrator to control the amplitude of the multiplied waveform inverse or double inverse with the duration of the scan period, for example, by first integrating the block waveform and than controlling the amplitude with a multiplier which is part of the integrator. Prior art U.S. Pat. No. 4,845,409 uses a tuned circuit with a resonance frequency of approximately twice the horizontal repetition frequency. The correction obtained in this way is only optimal for one certain horizontal repetition frequency. The resonance frequency of the tuned circuit needs to be adapted for other horizontal repetition frequencies. This adaption is not easily performed over a large range of horizontal repetition frequencies without manual adjustment or replacement of components.

In a further embodiment, the amplitude of the ramp signal is kept constant during the scan period by altering its steepness depending on the repetition frequency of the position signal. In this way, the pulses sliced out of the ramp signal have a duration being scaled with the duration of the scan period in a easy way. The effect of the pulses will appear at the same position and over the same length on the picture tube screen, independent of the duration of the scan period.

In a further embodiment, the block waveform comprises an addition of a first pulse being related to the flyback pulse and a second pulse being sliced out of the ramp signal. The duration of the second pulse is proportional to the duration of the scan period, as the ramp signal has an amplitude independent on the scan period. The contribution of the second pulse to the correction waveform has a constant amplitude if the amount of integrating of the block waveform is inversely proportional to the duration of the scan period. If the first pulse has a duration independent on the repetition frequency of the position signal, its duration relative to the duration of the scan period is already inversely proportional and a correction of the amount of integration of this first pulse is not desired. Hence, correcting the block waveform in total by changing the amount of integration does not provide an optimal frequency independent correction. Therefore, the second pulse, having a level inversely proportional with the duration of the scan period, is added to the first pulse having a constant level. Further, the integration is adapted to compensate for the integrating action of the deflection yoke only. The duration of the first pulse is constant if, for example, this pulse is sliced out of a flyback pulse which has a constant duration. The duration of the line flyback pulse depends on a resonance frequency of a tuned circuit in conventional line deflection circuits. In display apparatus suitable for different line scan frequencies, it is efficient to fix the duration of the (line) flyback pulse to accommodate the highest possible line scan frequency. The duration of a field flyback pulse is limited by a supply voltage, it is efficient to choose a constant value of a duration of the field flyback pulse fitting the highest possible field scan frequency.

A further embodiment relies on the following considerations. It is defined that the active period of the video information needs to be displayed, from edge-to-edge, in the relevant (horizontal or vertical) direction on the picture tube screen. Further, the period in which the ramp signal is generated is defined as the ramp period, this ramp period being at least as long as the active video period. If the amplitude of the ramp signal is kept constant at different scan periods, and the ratio of the active video period and the ramp period does not change, the second pulse being sliced out of the ramp signal correspondents with the same position on the picture tube screen. The desired deflection correction on every position in a line or field is reached. However, if the ratio of the active video period and the ramp period is not constant (which may be the case in displaying computer generated pictures), the ratio of the duration of the second pulse and the active video period changes: the correction is slightly dependent on the scan frequency. To compensate for this frequency dependency, the generation of the ramp signal has to be adapted. A possibility is to control the ramp period with information about the amplitude of the relevant scan (as example, an amplitude setting voltage, a measured value of the deflection current, or a repetition frequency of the position information) to obtain a constant ratio between this ramp period and the active video period (for example, both periods are kept equal). Another possibility is to adapt a start level and an amplitude of the ramp signal to keep the ratio of the duration of the second pulse and the active video period constant. For example, if the ramp generator is triggered by a first pulse being sliced out of the relevant flyback pulse having a duration independent on the scan frequency, the ramp signal has a ramp period which starts at the moment the first pulse becomes inactive, and which ends at the moment a succeeding first pulse becomes active. The video information to be displayed has an active video period which has a duration which fits within the ramp period, during which the ramp generator generates the ramp, and the active video period is positioned centered with respect to the center of the ramp period. If, at another scan frequency, the ratio of the active video period and the ramp period becomes smaller, the ratio between the duration of the second pulse and the active video period becomes larger. This last ratio can be kept constant by adapting the ramp signal to start at a lower level and to have a larger amplitude. The corrected ramp signal is still centered around the center of the active video period but has a steeper ramp. The second pulse being sliced out of this corrected ramp signal gets a smaller duration.

In another embodiment, a line correction waveform (a correction waveform which has a repetition frequency equal to the line frequency) needs to be amplitude controlled with a field correction waveform (a correction waveform which has a repetition frequency equal to the field frequency) if a correction is dependent on the field position on the picture tube screen.

In a further embodiment, a symmetrical line sawtooth has to be added to the correction voltage across the deflection yoke if a N/S bending correction is needed. The symmetrical line sawtooth should be amplitude modulated in response to the control signal to obtain a frequency independent correction. The symmetrical line sawtooth should not be amplitude modulated by the field correction waveform as the N/S bending correction has the same shape in every line.

Another embodiment of the invention concerns a method for correcting a north/south deflection error of a picture tube with a picture tube screen, the method comprising the steps of: generating a vertical deflection current in a vertical deflection yoke for deflecting in vertical direction at least one electron beam, developing a correction voltage across the vertical defection yoke, whereby the step of developing the correction voltage across the vertical deflection yoke comprises the steps of: generating a periodical horizontal waveform from a horizontal position signal related to a horizontal position of the electron beam on the picture tube screen, wherein the periodical horizontal waveform comprises substantially straight line sections, and a starting point of a next straight line section coincides with an end point of a preceding straight line section, generating a periodical vertical waveform from a vertical position signal related to a vertical position of the electron beam on the picture tube screen, and multiplying the horizontal waveform having said substantially straight line sections, by the vertical waveform to obtain the correction voltage.

Yet another embodiment of the invention concerns a north/south correction circuit for correcting a north/south deflection error of a picture tube with a picture tube screen, the correction circuit comprising: means for generating a vertical deflection current in a vertical deflection yoke for deflecting in vertical direction at least one electron beam, means for developing a correction voltage across the vertical defection yoke, whereby the means for developing the correction voltage across the vertical deflection yoke comprise: means for generating a periodical horizontal waveform from a horizontal position signal related to a horizontal position of the electron beam on the picture tube screen, wherein the periodical horizontal waveform comprises substantially straight line sections, and a starting point of a next straight line section coincides with an end point of a preceding straight line section, means for generating a periodical vertical waveform from a vertical position signal related to a vertical position of the electron beam on the picture tube screen, and means for multiplying the horizontal waveform having said substantially straight line sections, by the vertical waveform to obtain the correction voltage.

These and other aspects of the invention will be apparent from and elucidated with reference to the embodiments described hereinafter.

BRIEF DESCRIPTION OF THE DRAWINGS

In the drawings,

FIGS. 8a–8o show several waveforms corresponding to the embodiments of FIG. 5, FIG. 6, and FIG. 7;

FIG. 10 shows an embodiment of a circuit for generating a vertical correction waveform; and FIGS. 11a–11d show waveforms clarifying the operation of the circuit for generating the field correction waveform.

DESCRIPTION OF THE PREFERRED EMBODIMENTS

Figures 1A, 1B:
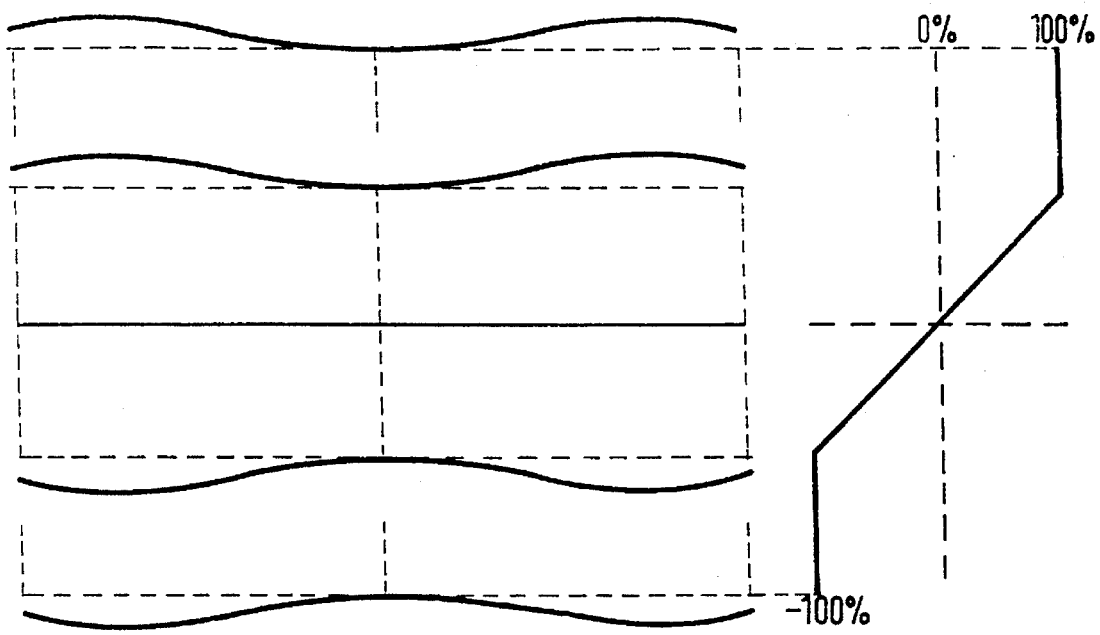
FIGS. 1a–1d illustrate examples of a seagull distortion on a screen of a picture tube.
Figures 1C, 1D:
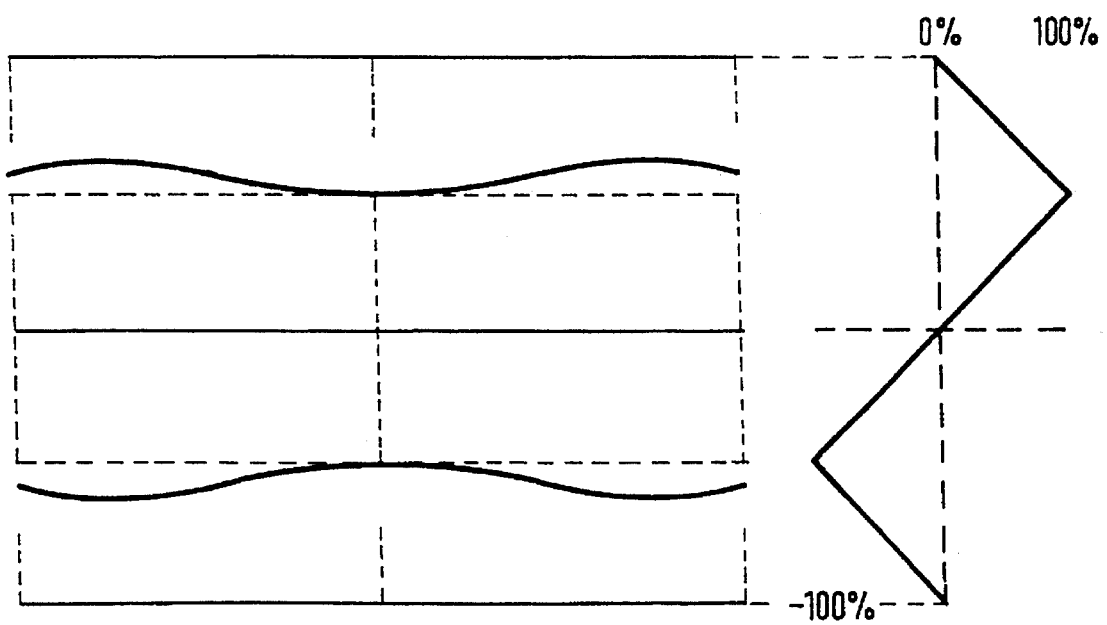

FIGS. 1a–1d illustrate examples of a (N/S) seagull distortion on a screen of a picture tube. To illustrate the invention, the operation of a correction circuit is explained for a N/S seagull distortion at a picture tube screen which is scanned in the usual way by horizontal lines which succeed each other in vertical direction. A N/S seagull distortion is a vertical displacement (more general: a displacement in the field direction) which, in principle, is symmetrical with respect to the center of the screen in east-west and in north-south direction. As is shown in FIG. 1a, for certain picture tubes, the distortion at the highest vertical position on the screen is maximal and remains almost constant at the upper part of the screen. The distortion reduces further towards the middle of the screen and becomes zero in the middle of the screen. At the lower half of the screen the amount of distortion is, in principle, the same as at the upper half but in the opposite direction. This seagull distortion can be compensated by multiplying a horizontal correction waveform (more general: line correction waveform) having the shape as shown at the highest vertical position on the screen with a vertical correction waveform (FIG. 1b). The amplitude of the vertical correction waveform is shown in horizontal direction, the vertical axis depicts the vertical position on the screen. Other picture tubes may show a distortion as sketched in FIG. 1c. Then, the horizontal correction waveform has to be multiplied with a vertical correction waveform as shown in FIG. 1d. As the sensitivity of the vertical deflection coil and the distortion on screen in mm is known, the maximum required correction current can be calculated. The required shape of the vertical correction current is picture tube dependent. In the present examples, the vertical modulation of the amplitude of the horizontal correction waveform is not essential to the invention, as the invention aims at correcting all kinds of distortions.

Figure 2:
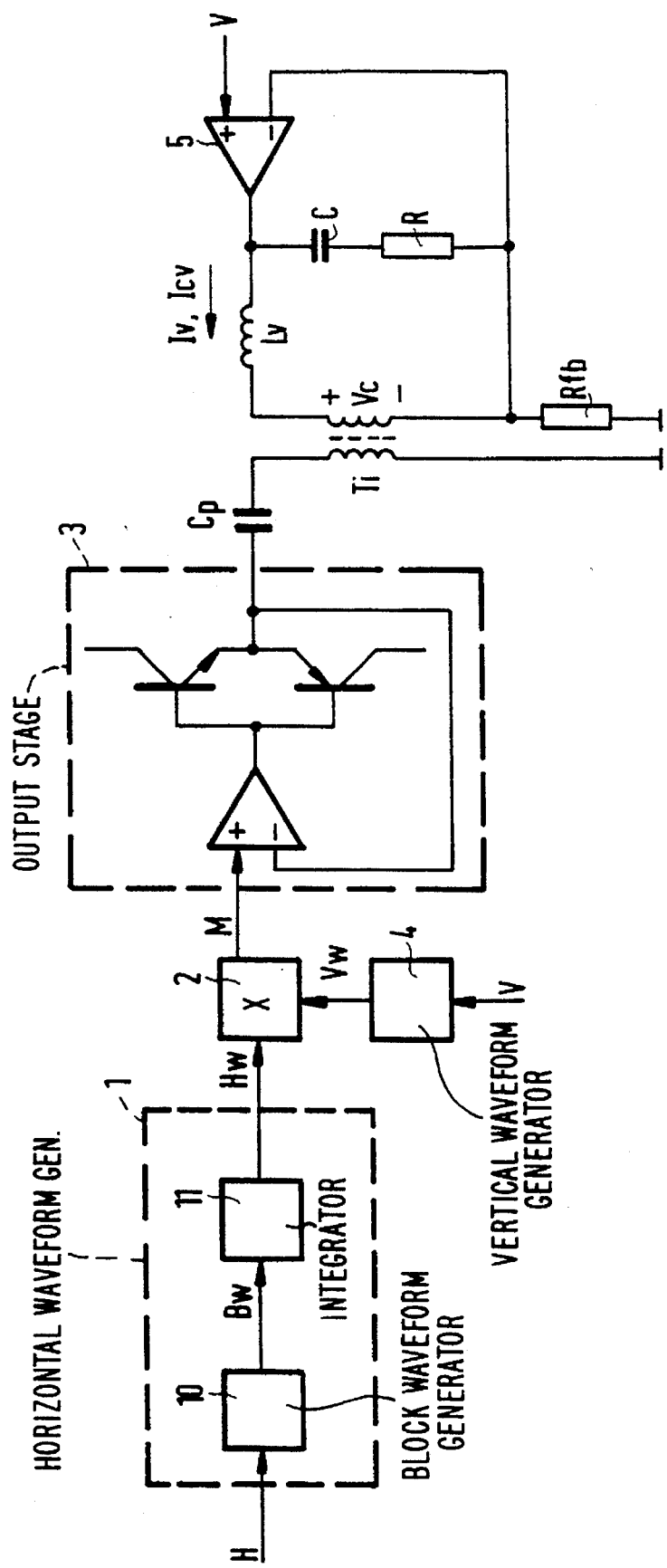
FIG. 2 shows a block diagram of a correction circuit in accordance with the invention.

FIG. 2 shows an example of a correction circuit in accordance with the invention. The high-order N/S distortion can be corrected by injecting a correction current Icv in a vertical deflection coil Lv. To keep the correction circuit attractive, a cheap solution is chosen, using the already existing vertical deflection coil Lv and adding only one extra wire-wound component, viz. an injection transformer Ti. A known vertical deflection stage, comprising a vertical output amplifier 5, generates a vertical deflection current Iv which flows through the vertical deflection coil Lv to scan the picture tube screen in vertical direction in response to a vertical position signal V. A feedback voltage, generated by the vertical deflection current Iv which flows through a feedback resistor Rfb, is supplied to a feedback input of the vertical output amplifier 5.

Using the injection transformer Ti is attractive for the following reasons: galvanic separation (easy to drive from IC's), separation of correction current Icv from the large vertical deflection current Iv, and the correction current Icv can be adapted easily for different sensitivities of the vertical deflection coil Lv.

As the correction circuit has to be able to drive various picture tubes showing different N/S distortions, a periodical horizontal correction waveform Hw is generated by a flexible horizontal waveform generator 1 in response to a horizontal position signal H.

Figures 4A, 4B, 4C, 4D, 4E, 4F, 4G, 4H:
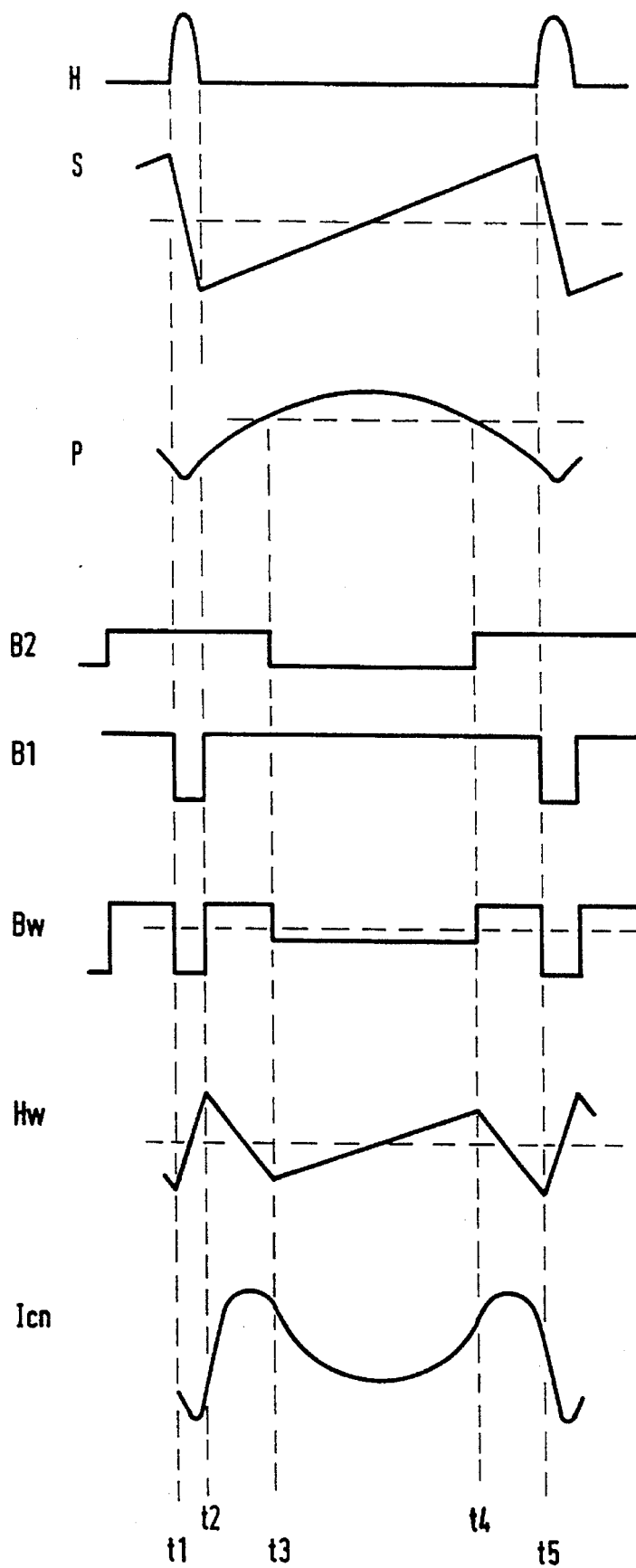
FIGS. 4a–4h show several waveforms illustrating the operation of the correction circuit of FIG. 2 and the embodiment of FIG. 3.

The correction circuit realizes a certain correction current Icv in the vertical deflection coil Lv. For example, a shape of the correction current Icv is shown in FIG. 4h. The required correction current Icv is injected in the vertical deflection coil Lv by the series connected injection transformer Ti. An output impedance of the vertical output amplifier 5, and the impedance of the feedback resistor Rfb are low with respect to the impedance of the vertical deflection coil Lv. As a result, the correction voltage Vc across the injection transformer Ti will appear across the vertical deflection coil Lv. The injection of a correction current Icv in a vertical deflection coil Lv by using an injection transformer Ti as such is known from prior art.

With data, obtained from the N/S distortion on the picture tube screen, the shape of the correction current Icv can be constructed. Experiments have shown, that the desired shape can be approximated accurately by a chain of parabola sections. These parabola currents appear by driving the vertical deflection coil Lv with a voltage comprising a chain of straight line sections, see FIG. 4g. The straight line sections have slopes and amplitudes such that, after integration of the straight line sections, the desired parabola sections are obtained.

The straight line sections may be generated by integrating a block-shaped waveform Bw (FIG. 4f) comprising blocks having a desired amplitude and duty cycle. The zero crossings and amplitudes of the parabola currents can be adjusted by controlling the duty cycle and/or amplitude of the blocks. The number of blocks to be generated depends on the number of parabola sections needed. In this embodiment, the horizontal waveform generator 1 comprises a block waveform generator 10, for supplying a horizontal block waveform Bw, and an integrating circuit 11, for integrating the horizontal block waveform Bw into the periodical horizontal waveform Hw.

The special high-order N/S distortion, referred to as seagull distortion, needs the horizontal correction waveform Hw supplied by the horizontal waveform generator 1 to be amplitude modulated by a vertical correction signal Vw depending on a vertical position on the picture tube screen. The amplitude modulation can be performed by a multiplier 2 receiving the horizontal correction signal Hw and the vertical correction signal Vw to supply a multiplied waveform M. The vertical correction signal Vw is generated by a vertical waveform generator 4 in response to a vertical position signal V.

An output stage 3, which may comprise a power operational amplifier, or an operational amplifier and output transistors, receives the modulated correction waveform M. The output voltage of the output stage 3 is a chain of straight line sections, which is amplitude modulated in the vertical direction. This output voltage is transformed by the injection transformer Ti to a correction voltage Vc across the vertical deflection coil Lv.

Figure 3:
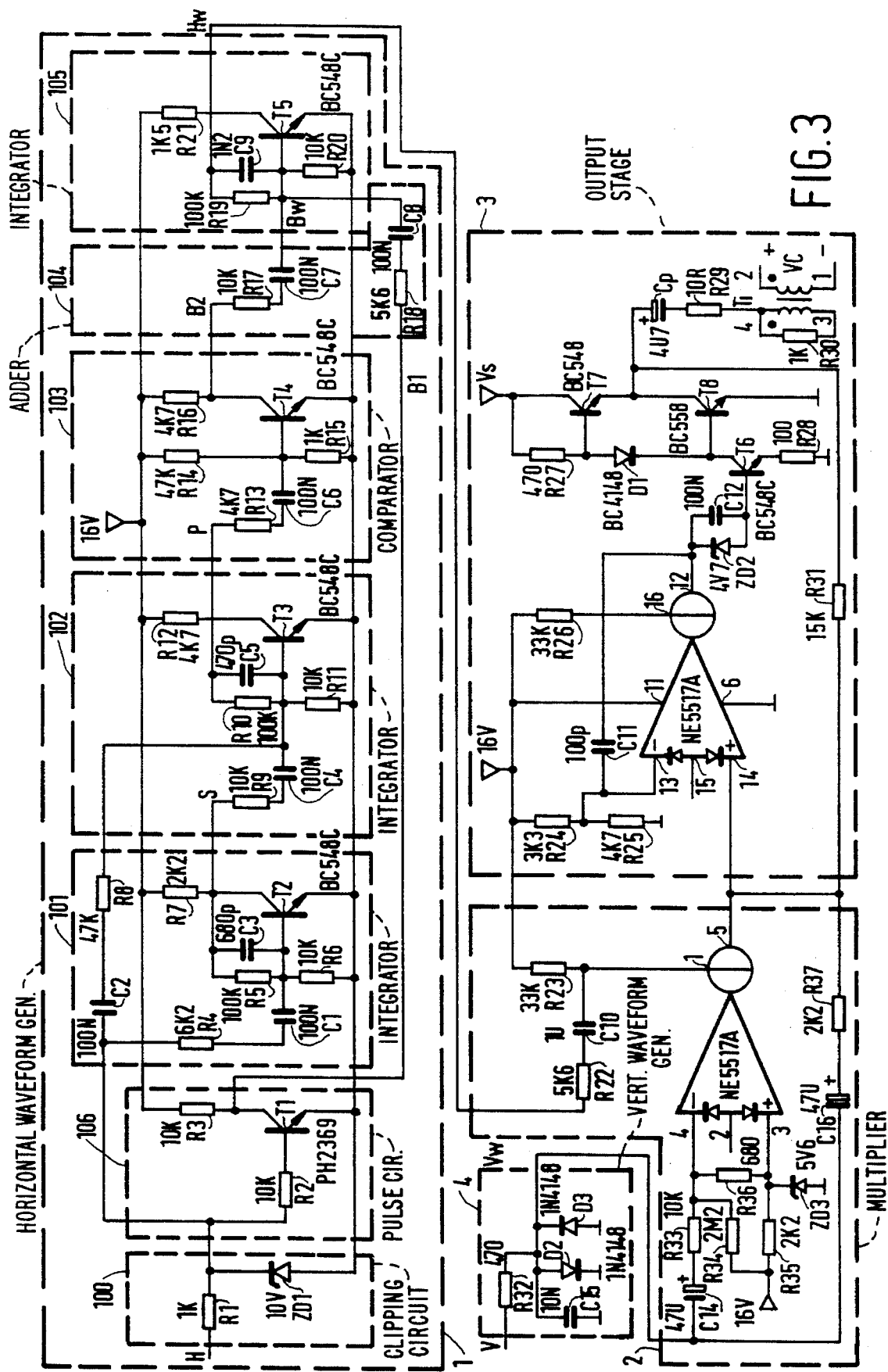
FIG. 3 shows a detailed schematic of a correction circuit in accordance with the present invention.

FIG. 3 shows a detailed embodiment, in accordance with the present invention, of a correction circuit as shown in FIG. 2. This embodiment shows a discrete correction circuit suitable to correct a symmetrical seagull distortion.

The horizontal waveform generator 1 receives the horizontal position information H, for example, being a line flyback pulse, see FIG. 4a. The line flyback pulse is clipped by a clipping circuit 100 to a clipped pulse being active during a horizontal flyback period (t1 to t2). The clipped pulse is supplied to a first integrator circuit 101 for supplying a sawtooth signal S, see FIG. 4b. The sawtooth signal S is generated by integrating the clipped pulse. The sawtooth signal will be symmetrical around the center of a line if this integrating is performed with respect to the mean level of the clipped pulse. The sawtooth signal S is supplied to a second integrator circuit 102 which supplies a parabola signal P, See FIG. 4c. The parabola signal P is generated by integrating the sawtooth signal S with respect to its mean level, referred to in FIG. 4b with a dashed line. In this way a parabola signal P is obtained which has a extreme value in the middle of the horizontal scan period (t2 to t5). A comparator 103 slices a block waveform B2 as shown in FIG. 4d out of this parabola signal P. The block waveform B2 is centered around the middle of the horizontal scan period and has a duration lasting from moment t3 to t4. The slicing is performed by comparing the parabola signal P (being a base voltage of a transistor T4) with a reference voltage Vref (in this case, ground potential on a emitter of transistor 3). A pulse circuit 106 receives the clipped pulse from the clipping circuit 100 to supply a pulse B1 (see FIG. 4e) which is active during the horizontal flyback period. An adding (or combining) circuit 104 adds the pulse B1 from the pulse circuit 106 to the block waveform B2 from the comparator 103 to obtain the block-shaped waveform Bw (see FIG. 4f). A third integrator circuit 105 integrates the block-shaped waveform Bw to obtain the horizontal correction waveform Hw (FIG. 4g). The horizontal correction waveform Hw is generated by integrating the block waveform Bw with respect to its mean level, referred to in FIG. 4f with a dashed line. The correction current Icv (FIG. 4h) is developed by integrating the horizontal correction waveform Hw in the vertical deflection coil Lv.

The clipping circuit 100 comprises a resistor R1 and a zener diode Zd1. The first integrator 101 comprises resistors R4, R5, R6, and R7, capacitors C1 and C3, and a transistor T2. The second integrator 102 comprises resistors R9, R10, R11, R12, capacitors C4 and C5, and a transistor T3. The comparing circuit 103 comprises resistors R13–R16, a capacitor C6, and a transistor T4. The adding circuit 104 comprises resistors R17, R18, and capacitors C7 and C8. The third integrator circuit 105 comprises resistors R19, R20, and R21, a capacitor C9, and a transistor T5. The pulse circuit 106 comprises resistors R2 and R3, and a transistor T1.

To compensate for a phase shift caused by the first and second integrator circuits 101, 102, which are not ideal integrators, the clipped pulse is added, via resistor R8 and capacitor C2, to an input of the second integrator circuit 102 to reach a symmetrical parabola signal P.

The vertical waveform generator 4 receives a vertical sawtooth voltage V, in this case available across the feedback resistor Rfb in the vertical deflection stage, and supplies the vertical correction waveform Vw having a clipped vertical sawtooth waveform (FIG. 1b) which is needed to correct the seagull distortion shown in FIG. 1a. The vertical waveform generator 4 comprises a resistor R32 having a first end coupled to receive the vertical sawtooth voltage V and another end connected to a parallel arrangement of two anti-parallel-arranged diodes D2, D3 and a capacitor C15. The second end of the resistor R32 supplies the vertical correction waveform Vw. If the vertical output stage 5 is a bridge configuration, the vertical sawtooth voltage V must be generated separately. If the raster distortion of a picture tube-coil combination causes distortion which depends on the vertical position on the screen of the picture tube in another way as shown in FIG. 1a, the vertical waveform generator 4 has to be modified. Another embodiment of a vertical waveform generator, which corrects the distortion shown in FIG. 1c, can be found in FIG. 10.

The multiplier 2 comprises a transconductance amplifier, resistors R22, R23, R33–R37, capacitors C10, C14, C16, and a zener diode ZD3. As the transconductance amplifier, one of the two available transconductance amplifiers of an NE5517A is used. As the multiplier 2 is a 2-quadrant and not a 4-quadrant multiplier, the multiplied waveform M would be biased by a constant current. This constant current is subtracted from the output current of the multiplier 2 via resistor R37 and capacitor C16.

The output stage 3 comprises a differential amplifier (in this case, the second transconductance amplifier of the NE5517A), resistors R24–R28, and R31, capacitors C11, C12, a diode D1 and a zener diode ZD2, and transistors T6, T7, T8. The output stage receives the multiplied waveform M and supplies a correction voltage to the injection transformer Ti. The resistor R31 converts the input current representing the multiplied waveform M into an output voltage.

As a direct feedback of the correction current Icv is not available, an impedance present between the correction voltage Vc on the secondary winding of the injection transformer, and the vertical deflection coil Lv has to be small with respect to the impedance of the injection transformer Ti and the impedance of the vertical deflection coil Lv. This is to prevent an intolerable distortion of the correction current Icv. Due to a relatively small magnetizing current flowing in the injection transformer Ti, the output transistors T7, T8 can be small signal transistors.

The output impedance of a DC- and AC-coupled vertical deflection stage 5 is so small that it has no influence on the working principle of the circuit. A damping network, comprising a series arrangement of a resistor R and a capacitor C, should be connected between the output of the vertical output amplifier 5 and one the end of the feedback resistor Rfb connected with the injection transformer Ti, to reduce the load on the injection transformer Ti. Usually, this damping network R, C is arranged in parallel to the vertical deflection coil Lv. The correction current Icv causes a voltage ripple on the output of the vertical output stage 5. The voltage ripple is dependent on the output impedance of the vertical output stage 5, and on counter actions by a vertical feedback loop (Rfb). At the frequencies involved in the correction current Icv, typically, a voltage ripple of 1 V peak-to-peak can be found. A required additional supply voltage for the vertical output stage 5 is determined by the additional series resistance, caused by adding the injection transformer Ti in a loop in which the vertical deflection current Iv is flowing, and the ripple voltage. In practice, the series resistance of the secondary of the injection transformer Ti is small with respect to a resistance of the vertical deflection coil Lv. The series inductance of the injection transformer Ti should be small to minimize an increase of a duration of the vertical flyback period.

A transformation ratio of the injection transformer Ti is determined by the required amplitude of the correction voltage Vc and the value of a primary supply voltage Vs. A the number of turns of the injection transformer Ti depends on its core size, the vertical deflection current Iv and the horizontal scan frequency. To prevent a phase shift between the correction voltage Vc supplied by the output stage 3 and the correction current Icv, a resistive part of an impedance of the primary of the injection transformer Ti has to be low with respect to the inductive part of it.

Coupling capacitor Cp has been optimized to give minimal disturbance of the seagull correction current Icv after a vertical flyback period. Series resistor R29 is added to realize a critical damping of the circuit after the vertical flyback period. Parallel resistor R30 is applied to realize a critical damping after a horizontal flyback period.

It might be desired to change the shape of the correction current Icv by adapting the zero crossings of the seagull correction to compensate for a raster distortion of a certain type of tube/coil combination. This can be realized in the horizontal waveform generator 1 by adjusting the duty cycle of the block waveform A with resistor R15 of comparator 103. Moreover, the amplitude of the seagull correction at the left and right edges of the picture tube screen can be adjusted with resistor R18, which influences the amplitude of the pulse B1. The amplitude of the correction voltage can be fixed by resistor R31. The component values, shown as an example, are related to a correction circuit suitable for a line frequency of 32 kHz.

FIGS. 4a–4h show several waveforms illustrating the operation of the correction circuit of FIG. 2 and the embodiment of FIG. 3. As these waveforms have already been referred to in the description of FIG. 2 and FIG. 3, no further elucidation is needed.

Figure 5:
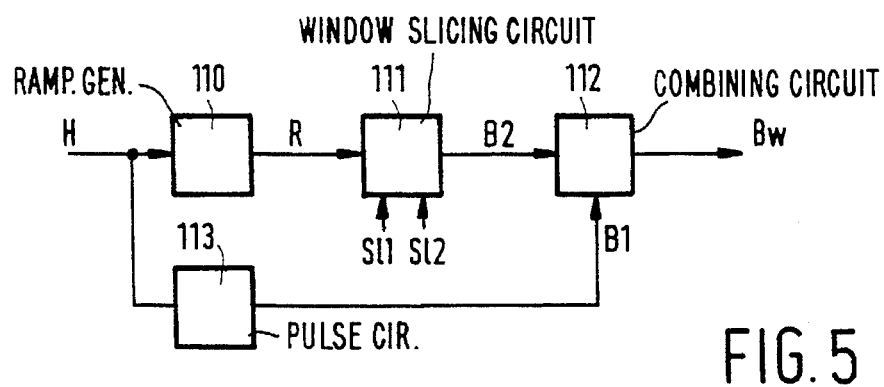
FIG. 5 shows a block diagram of a circuit for generating a block waveform in accordance with the present invention.

FIG. 5 shows an embodiment of a circuit for generating a block waveform Bw for use in the horizontal waveform generator 1 of FIG. 2. Several waveforms corresponding to the embodiment of FIG. 5 are shown in FIG. 8.

The block waveform generator 10 comprises a ramp generator 110, a window slicing circuit 111, a combining circuit 112, and a pulse circuit 113. The ramp generator 110 generates a ramp signal R (FIG. 8b) which is synchronized to the horizontal position signal H (FIG. 8a) and produced during a horizontal scan period Ts. The window slicing circuit 111 generates a pulse B2 (FIG. 8c) by slicing the ramp signal R with two different slicing levels S11, S12 (FIG. 8b). The position of the pulse B2 in the scan period depends on the values of the slicing levels S11, S12. More than one pulse B2 can be generated by using more than two slicing levels S11, S12, if a more accurate horizontal correction signal Hw is desired. In this case, it is possible to control the amplitude of each of the pulses B2 separately. The pulse circuit 113 generates a second pulse B1 (FIG. 8d) in response to the horizontal position signal H during the horizontal flyback period Tf1. The pulse circuit 113 is very simple if the second pulse B1 is a sliced horizontal position information H. The second pulse B1 can be amplitude controlled, and can be active during part of the horizontal flyback period Tf1. An easy adaptable duration of the second pulse B1 can be obtained by slicing it out of a ramp signal being generated during the horizontal flyback period Tf1. It is also possible to generate more than one pulse B1 during the horizontal flyback period. The combining circuit 112 combines or adds the levels of the first pulse B2 and the second pulse B1 to produce the block waveform Bw. The block waveform Bw (FIG. 8e) comprises two levels L1, L2 during the scan period if one such pulse B2 is generated. The shape of the integrated block waveform, which is the horizontal correction signal Hw, can be adapted by changing the slicing levels S11, S12, or by controlling the amplitude of the pulse B2.

Figure 6:
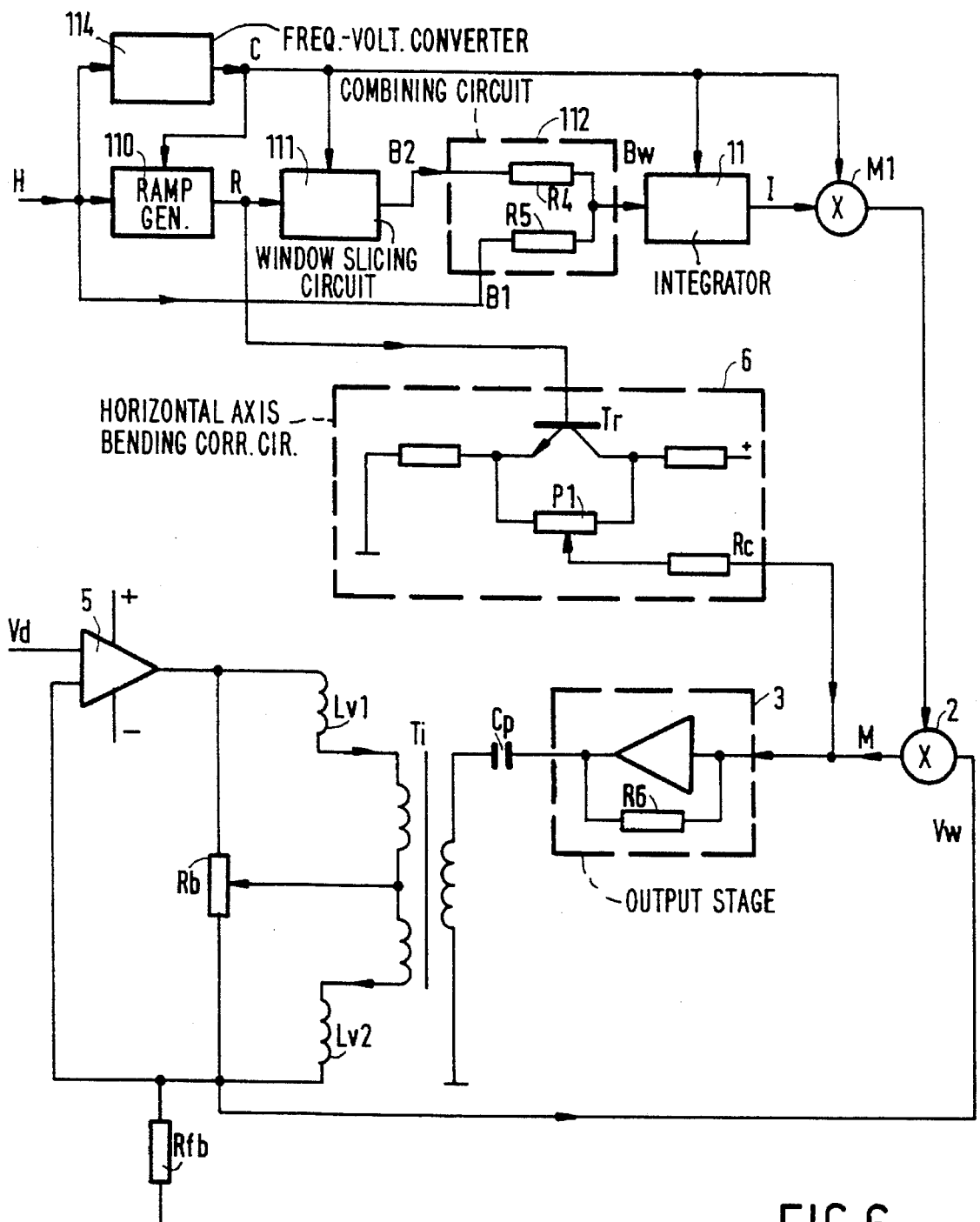
FIG. 6 shows another block diagram of a correction circuit in accordance with the invention.

FIG. 6 shows another example of a correction circuit in accordance with the invention. This N/S correction circuit is able to compensate the N/S distortions at different horizontal and vertical deflection frequencies as occur in (computer) monitors. FIGS. 8a–8o shows waveforms explaining the functioning of the N/S correction circuit. This N/S correction circuit comprises a ramp generator 110, a window slicing circuit 111, and a combining circuit 112 as described in FIG. 5. So, the ramp generator 110 generates a ramp signal R which is synchronized to the horizontal position signal H and produced during a horizontal scan period Ts. The window slicing circuit 111 generates a pulse B2 by slicing the ramp signal R with two different slicing levels S11, S12. Now, the second pulse B1 is equal to the horizontal position signal H. The second pulse B1 can be amplitude controlled. The combining circuit 112 combines or adds the levels of the first pulse B2 and the second pulse B1 to produce the block waveform Bw. This N/S correction circuit further comprises a frequency-to-voltage converter 114 which supplies a control signal C in response to the horizontal position signal H. The control signal C has a value which depends on a repetition frequency of a horizontal position information H or on the horizontal deflection frequency. The control signal C is supplied to the ramp generator 110 and/or the window slicing circuit 111, and/or an integrator 11. The integrator 11 integrates the block waveform Bw supplied by the combining circuit 112 into an integrated block waveform I. A first multiplier M1 is added to receive the integrated block waveform I and the control signal C to supply the horizontal correction waveform Hw. The horizontal correction waveform Hw is the integrated block waveform I that is amplitude controlled in response to the control signal C.

The operation of the frequency compensated N/S correction circuit, as discussed so far, is elucidated for the situation that the horizontal deflection frequency increases. In case of a smaller horizontal scan period Ts' (see FIG. 8f) the ramp generator 110 supplies a steeper ramp signal R' (FIG. 8g) to keep the maximum amplitude of the ramp signal R substantially constant. Alternatively, it would be possible to lower the slicing levels S11', S12' of the window slicing circuit 111. In this way, the pulses B2' (FIG. 8h) sliced out of the ramp signal R' have a duration which is scaled with the duration of the horizontal scan period Ts' in a easy way. The effect on the picture tube screen of the pulses B2' will appear on the same position and for the same length, independent of the duration of the horizontal scan period Ts, Ts'. The integrator 11 increases its integrating action to generate steeper, substantially sawtooth sections to keep the same peak-to-peak value of the horizontal correction waveform Hw. The smaller integration time available for the integrating action of the vertical deflection coil Lv (in FIG. 6, divided in two sections Lv1 and Lv2) causes a decreased amplitude of the correction current Icv at a constant amplitude of the horizontal correction waveform Hw. The amplitude of the horizontal waveform Hw can be increased with the first multiplier M1 to compensate for the smaller integration time available for the integrating action of the vertical deflection coil Lv. It is also possible to omit the first multiplier M1 by adapting the integrator 11 to increase the steepness of the substantially sawtooth sections to also compensate for the smaller correction current Icv in the vertical deflection yoke Lv. It is also possible to keep the integrating action constant and to increase the amplitude of the horizontal correction waveform Hw with the first multiplier M1 to compensate for the decreased amplitude of the integrated block waveform Bw, and for the decreased correction current Icv in the vertical deflection coil Lv.

The N/S correction circuit further comprises a second multiplier 2, an output stage 3, a coupling capacitor Cp, an injection transformer Ti, a vertical deflection coil Lv1, Lv2, a vertical output stage 5, a feedback resistor Rfb, and a balance resistor Rb. An output of the output stage 3 is connected to a primary winding of the injection transformer Ti via the coupling capacitor Cp. The secondary winding of the injection transformer Ti is split into in a first and a second half winding which are arranged in series. A first half of the vertical deflection coil Lv1 is arranged between an output of the vertical output stage 5 and a free end of the first half winding. A second half of the vertical deflection coil Lv2 is arranged between a free end of the second half winding and the feedback resistor Rfb. The other end of the feedback resistor Rfb is connected to ground. A adjustable balance resistor Rb has a slicer input which is connected to the junction of the first and second half windings. A fixed resistor part of the balance resistor Rb is connected between the output of the vertical output stage 5, and a junction of the feedback resistor Rfb and the second half winding. The balance resistor Rb balances the currents through the first Lv1 and second Lv2 halves of vertical deflection coil. The secondary winding of the injection transformer Ti needs to be split into in two sections to avoid high N/S currents through the balance resistor Rb. It is also possible to connect the two halves of the vertical deflection coil Lv1, Lv2 at one end with each other. The free ends of the two halves of the vertical deflection coil Lv1, Lv2 are coupled together via the balance resistor Rb. The slider connection of the balance resistor Rb is coupled with the secondary winding of the injection transformer Ti, this secondary winding need not be split.

The vertical output stage 5 has a first input to receive a vertical drive waveform Vd which is related to the vertical position signal V. The vertical output stage 5 has a second input to receive a vertical feedback voltage developed across the feedback resistor Rfb. The vertical output stage 5 generates a vertical deflection current Iv through the vertical deflection coil Lv1, Lv2. The output stage 3 supplies an amplified correction voltage which is coupled across the vertical deflection coil Lv1, Lv2 via the injection transformer Ti to obtain the correction current Icv in the vertical deflection coil Lv1, Lv2.

To cope with different vertical deflection frequencies, the second multiplier 2 receives the horizontal correction waveform Hw, supplied by the first multiplier M1, and a vertical correction waveform Vw. The second multiplier 2 supplies a multiplied correction waveform M to the output stage 3. The multiplied correction waveform M is the horizontal correction waveform Hw multiplied with the vertical correction waveform Vw. The vertical correction waveform Vw is related to the vertical deflection current Iv in the vertical deflection coil Lv, for instance, the vertical correction waveform Vw can be the feedback voltage across the feedback resistor Rfb. In deriving the vertical correction waveform Vw from the vertical deflection current Iv, vertical frequency changes are compensated automatically.

A horizontal axis bending correction circuit 6 receives the ramp signal R and supplies a corrected ramp signal Rc to an input of the output stage 3. The corrected ramp signal Rc comprises a horizontal ramp with a increasing or decreasing slope. The corrected ramp signal Rc has to be added after the multiplication of the horizontal waveform Hw with the vertical waveform Vw, as the horizontal axis bending distortion is independent of the vertical position. The horizontal axis bending correction circuit 6 may comprise a transistor Tr which supplies ramp signals having opposite slopes on its collector and emitter, respectively. The corrected ramp signal Rc is supplied by a slicer terminal of a potentiometer connected between the collector and emitter of the transistor Tr. The amplitude of the corrected ramp signal Rc can be controlled in response to the control signal C to compensate for the changing integrating action of the vertical deflection coil Lv at different horizontal scan frequencies.

Figure 7:
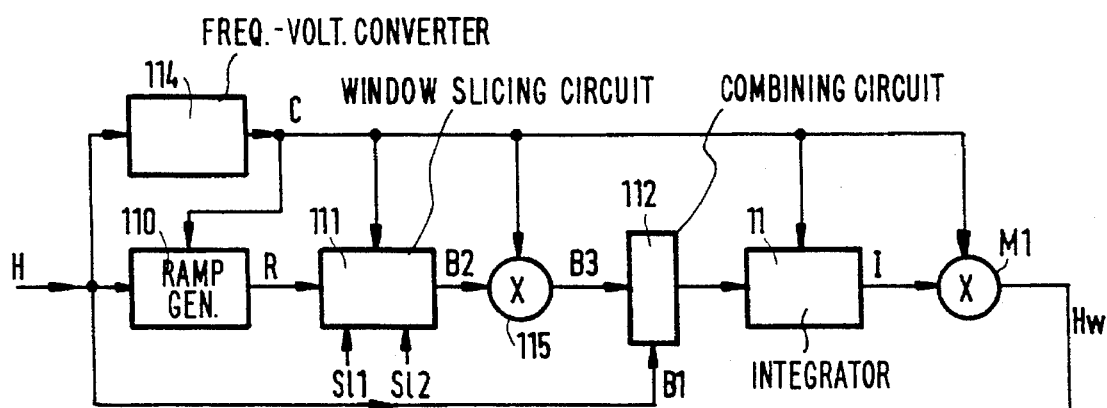
FIG. 7 shows yet another block diagram of a correction circuit in accordance with the invention.
Figure 7:
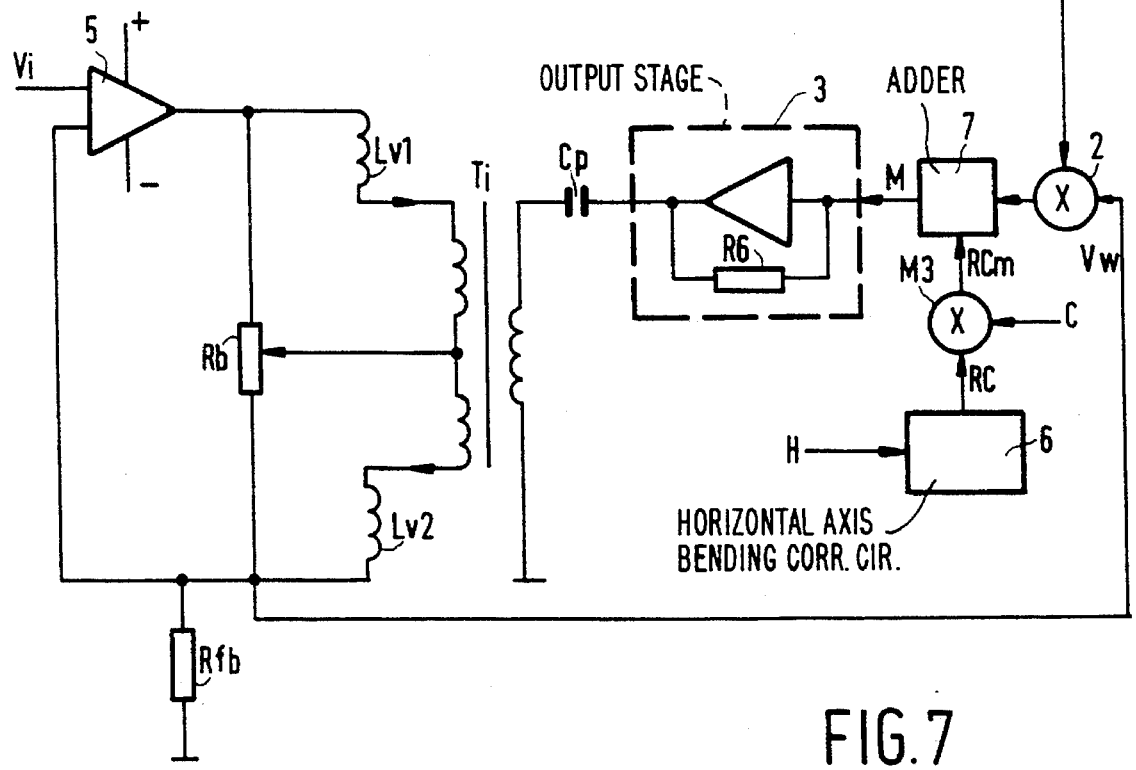

FIG. 7 shows another example of a correction circuit in accordance with the invention. This N/S correction circuit is based on the circuit shown in FIG. 6.

In the embodiment according to FIG. 7, the block waveform Bw" (FIG. 8o) comprises a composition of a first pulse B1" (FIG. 8n), which is related to the horizontal position signal H" (FIG. 8k), and a second pulse B2" (FIG. 8m) which is sliced out of the ramp signal R" (FIG. 8l) The duration of the second pulse B2" is proportional to the duration of the horizontal scan period Ts" (for example, the amplitude of the ramp signal R is independent on the horizontal scan period Ts). The contribution of the second pulse B2" to the horizontal correction waveform Hw has a constant amplitude if the amount of integration of the block waveform Bw" is inversely proportional to the duration of the horizontal scan period Ts. However, if the first pulse B1" has a duration independent of the horizontal scan frequency, its duration relative to the duration of the scan period Ts is already inversely proportional, and a correction of the amount of integration is not desired. Hence, correcting the block waveform Bw by changing the amount of integration does not provide an optimal frequency independent correction. Therefore, in comparison to the embodiment according to FIG. 6, an amplitude control 115 is added between the window slicing circuit 111 and the integrator 11, the amplitude control 115 receiving the second pulse B2 and the control signal C, and supplying a third pulse B3. The third pulse B3 has a level inversely proportional with the duration of the horizontal scan period Ts, as is shown in FIG. 8o. This third pulse B3 is added, by an adder 112, to the first pulse B1" which has a constant level. In comparison to the circuit shown in FIG. 6, now the integrating circuit 11 or the first multiplier M1 is adapted to compensate for the integrating action of the vertical deflection coil Lv only. The duration of the first pulse B1" is independent of the horizontal repetition frequency if, for example, this pulse is sliced out of a horizontal flyback pulse having a constant duration. In conventional horizontal deflection circuits, the duration of the horizontal flyback pulse is determined by a resonance frequency of a tuned circuit. As in the tuned circuit, large currents flow and large voltages exist, and an adaption of its resonance frequency needs expensive components. Therefore, in display apparatus suitable for different horizontal scan frequencies, it is efficient to fix the duration of the flyback pulse to accommodate the highest possible horizontal scan frequency.

The horizontal axis bending correction circuit 6 now receives the horizontal position information H and supplies a ramp signal Rc. The ramp signal Rc is amplitude controlled by a multiplier M3 in response to the control signal C to correct for different horizontal scan frequencies. The corrected ramp signal Rcm, supplied by the multiplier M3, comprises a horizontal ramp with a increasing or decreasing slope, and is added by an adder 7 to the multiplied correction waveform M. As in FIG. 6, the multiplied correction waveform M is the result of the multiplication by the multiplier 2 of the horizontal waveform Hw with the vertical waveform Vw.

FIGS. 8a–8o show several waveforms corresponding to the embodiment of FIG. 7. These waveform have been explained in the description of FIGS. 6 and 7. In FIGS. 8f–8j, the horizontal position information H' is scaled with the horizontal repetition frequency. In FIGS. 8k–8o, the horizontal position information H" has a duration being independent of the horizontal repetition frequency. Although, in the embodiment described in FIG. 6, an optimal frequency independency of the horizontal correction waveform Hw is obtained if the horizontal position information H' is scaled with the horizontal repetition frequency, an acceptable frequency dependency may be reached if the horizontal position information has a fixed duration. In the same way, the embodiment described in FIG. 7 may reach an acceptable frequency dependency if the horizontal position information H" is scaled with the horizontal repetition frequency.

Figure 9A:
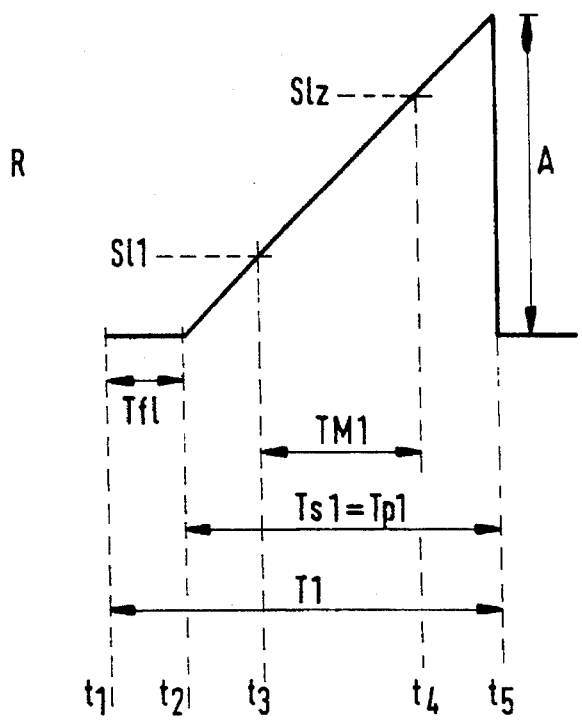
FIGS. 9a and 9b show waveforms clarifying the operation of a ramp generator according to the invention.
Figure 9B:
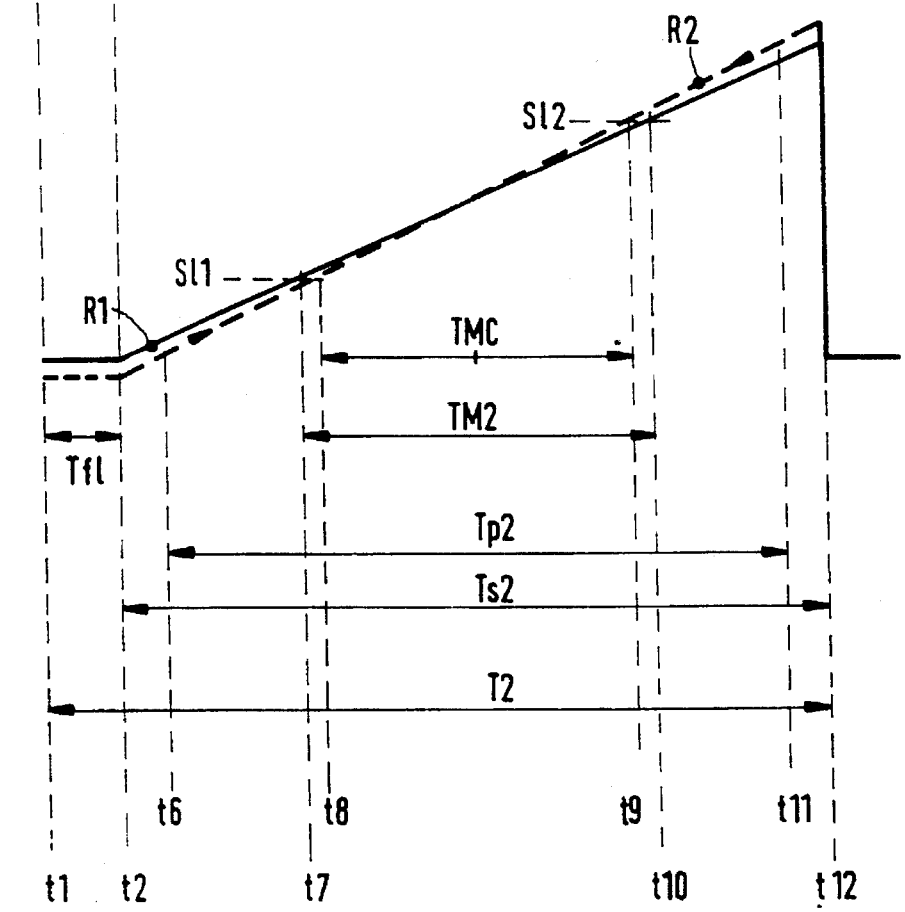

FIGS. 9a–9b shows waveforms clarifying the operation of the ramp generator 110 of FIGS. 5, 6 and 7. FIG. 9a shows a ramp signal R which is generated at a first horizontal repetition frequency which has a horizontal period time T1 lasting from moment t1 to t5. The amplitude of the ramp signal R has a maximum value A. The horizontal flyback period Tf1 lasts from moment t1 to moment t2. The horizontal scan period Ts1 lasts from moment t2 to moment t5. The ramp signal R increases during the horizontal scan period Ts1. The picture tube screen is scanned from edge to edge during a picture period Tp1 which, in this case, is equal to the horizontal scan period Ts1. A second pulse B2, being active during a pulse period Tm1 lasting from moment t3 to t4, is generated by slicing the ramp signal R with two selected slicing levels S11, S12.

FIG. 9b shows, as a solid line, a first ramp signal R1, and, as a dashed line, a second ramp signal R2, both being generated at a second horizontal repetition frequency having a horizontal period time T2 lasting from moment t1 to t12.

To explain the operation of the ramp generator 110, the second horizontal repetition frequency is chosen to be half the first horizontal repetition frequency. Hence, the horizontal period time T2 is two times longer than the horizontal period time T1 of FIG. 9a. The horizontal flyback period Tf1 has a constant duration and still lasts from moment t1 to moment t2. The horizontal scan period Ts2 lasts from moment t2 to moment t12. Both ramp signals R1, R2 increase during the horizontal scan period Ts2. The picture tube screen is scanned from edge to edge during a picture period Tp2. In this case, the duration of the picture period Tp2 is shorter than the horizontal scan period Ts2.

The first ramp signal R1 is controlled by the control signal C to keep its amplitude A constant. The second pulse B2 is generated by slicing the first ramp signal R1 with the two unchanged slicing levels S11, S12. The second pulse B2 is active during a pulse period Tm2 lasting from moment 17 to t10. As can be concluded from FIG. 9b and FIG. 9a, the ratio of the pulse period Tm2 and the picture period Tp2 is larger than the ratio of the pulse period Tm1 and the picture period Tp1. Hence, the correction on the picture tube screen caused by the second pulse B2, extends over a longer distance of the picture tube screen. To compensate for this frequency dependency of the correction, the ramp generator 11 has to be adapted.

A first possibility is to adapt a start level and the amplitude of the ramp signal R1 to keep the ratio of the duration of the second pulse B2 and the active video period Tp2 constant. If the ratio of the ramp period Ts and the active video period Tp increases, the ratio between the duration of the second pulse B2 and the active video period Tp increases also. This last ratio can be kept constant by adapting the ramp signal R1 to start at a lower level and to have a larger amplitude, see the dashed line in FIG. 9b. The corrected ramp signal R2 has the same level as the uncorrected ramp signal R1 at a center of the active video period Tp2 to keep the second pulse B2 centered around the center of the active video period Tp2, which is important if a symmetrical correction is needed.

A second possibility is to control the ramp period Ts2 in response to the horizontal repetition frequency to obtain a constant ratio between this ramp period Ts2 and the active video period Tp1, Tp2 (for example, the ramp period Ts2 is kept equal to the active video period Tp2). In this case, the ramp signal R follows the dashed line between the moments t6 and t11, and has an amplitude A. The correction of the ramp signal R has to be performed with an information about the amplitude of the horizontal scan (for example, an amplitude setting voltage, or a measured value of the horizontal deflection current) which is related to the horizontal repetition frequency. The horizontal repetition frequency is determined by the repetition frequency of the horizontal position signal H.

FIG. 10 shows an embodiment of a vertical waveform generator 4 for supplying a vertical correction waveform Vw as shown in FIG. 1d. FIGS. 11a–11d show waveforms to elucidate the operation of this vertical waveform generator 4. The vertical waveform generator 4 receives a vertical sawtooth voltage V (FIG. 11a) available across the flyback resistor Rfb. The vertical sawtooth voltage V has a vertical period time lasting from tv1 to tv5, and a vertical scan period Tvs lasting from tv1 to tv4. A transistor T28 has a base, which receives the vertical sawtooth voltage V via a series arrangement of a resistor R86, a parallel arrangement of diodes D10 and D11, and a resistor R74, a collector coupled with a supply voltage VB via a resistor R90, and an emitter coupled to ground via a resistor R89. The diodes D10, D11 are arranged in anti-parallel. A resistor R87 is connected between the ground and a junction of the resistor R86 and the parallel arrangement of the diodes D10, D11. A resistor R88 is coupled between the base of the transistor T28 and the supply voltage Vb. A transistor T29 has a base coupled to the collector of the transistor T28 via a resistor R91, a collector connected to the supply voltage Vb, and an emitter coupled to the ground via a resistor R84. A capacitor C38 is coupled between the base of the transistor T29 and the ground. The emitter of the transistor T29 supplies the vertical correction waveform Vw. A resistor R92 is coupled between the base of transistor T29 and a junction of the resistor R74 and the parallel arrangement of the diodes D10, D11.

The vertical waveform generator 4 operates as explained below. An input voltage Vi (FIG. 11b) is clipped out of the vertical sawtooth voltage V with diodes D10, D11. Due to the voltage drop Vd10, Vd11 across the diodes D10, D11, only the sawtooth parts between moments tv1 and tv2 and between moments tv3 and tv4 are present in the input voltage Vi. The base voltage Vb of the transistor T28 has the same shape as the input voltage Vi but is DC-shifted by resistors R86 and R88. The collector voltage Vc (FIG. 11c) of the transistor T28 is an inverted and amplified base voltage Vb. The collector voltage Vc and the vertical sawtooth voltage V are added via resistor R91 and R92, respectively, and buffered by emitter follower T29 to supply the vertical correction waveform Vw (FIG. 11d). Capacitor C38 softens the sharp edges of the vertical correction waveform Vw, and suppresses high frequency disturbances.

It will be evident that variations of the embodiments described above are possible within the scope of the invention as claimed. Although the embodiments show analog and discrete circuits, it is also possible to use analog or digital circuits suitable for integration in an integrated circuit, or to use a microcomputer being programmed in a suitable way.

It is also possible to generate a high order correction voltage according to the invention for correcting horizontal and vertical convergence errors by driving suitable deflection coils.

We claim:

1. A method of correcting a deflection distortion of a picture tube by developing a correction current through a deflection yoke, the method comprising the steps of:

generating a periodical waveform synchronized to a position signal, and having a repetition period comprising a scan period and a flyback period; and coupling the periodical waveform, as a correction voltage, to the deflection yoke to develop the correction current in the deflection yoke by an integrating action of the deflection yoke;

characterized in that the step of generating the periodical waveform comprises the steps of:

generating a periodical block waveform comprising more than two successive levels during said scan period; and integrating the periodical block waveform into the periodical waveform comprising more than one straight line section each having a non-zero slope and a duration shorter than a duration of the scan period, wherein a starting point of a next straight line section coincides with an end point of a preceding straight line section, and wherein the periodical waveform comprises more than one straight line section during said scan period for obtaining the correction current comprising a chain of parabola sections during said scan period.

2. A method of correcting a deflection distortion according to claim 1, characterized in that the step of generating the periodical block waveform comprises the steps of:

generating a first pulse being active during the flyback period;

integrating the first pulse into a sawtooth waveform;

integrating the sawtooth waveform into a parabola waveform;

comparing the parabola waveform with a slicing level for generating a second pulse; and adding the first pulse to the second pulse.

3. A method of correcting a deflection distortion according to claim 1, characterized in that the step of generating the periodical block waveform comprises the steps of:

generating a ramp signal being synchronized to the position signal; and generating, during said scan period, at least one pulse by slicing the ramp signal with slicing levels, wherein said at least one pulse divides said scan period into at least three sections.

4. A method of correcting a deflection distortion according to claim 3, characterized in that the step of generating the periodical block waveform comprises the further steps of:

generating a second pulse during the flyback period; and adding the second pulse to said at least one pulse.

5. A method of correcting a deflection distortion according to claim 1, characterized in that the step of generating the periodical waveform comprises the further step of generating a control signal having a value indicative of a repetition frequency of the position signal, and in that the step of integrating the periodical block waveform is adapted to substantially stabilize an amplitude of the correction current in response to the control signal.

6. A method of correcting a deflection distortion according to claim 3, characterized in that the step of generating the periodical waveform comprises the further step of generating a control signal having a value indicative of a repetition frequency of the position signal, and in that the step of generating the ramp signal is adapted to substantially stabilize the amplitude of the ramp signal in response to the control signal.

7. A method of correcting a deflection distortion according to claim 6, characterized in that the step of generating the periodical waveform comprises the further steps of:

controlling an amplitude of said at least one pulse with the control signal to obtain an amplitude controlled pulse having an amplitude inversely proportional to a duration of said scan period; and adding a second pulse to the amplitude controlled pulse to obtain the block waveform.

8. A method of correcting a deflection distortion according to claim 6, characterized in that in said substantially stabilizing the amplitude of the ramp signal, a slope of the ramp signal is adjusted in response to the repetition frequency of the position signal to compensate for a changing ratio between the active period of said at least one pulse and an active video period at different repetition frequencies of the position signal.

9. A method of correcting a deflection distortion according to claim 1, characterized in that the repetition period is equal to a line period, and in that the method of correcting the deflection distortion comprises the further steps of:

generating a second periodical waveform from a second position information, the second periodical waveform having a second period time equal to a field period; and controlling an amplitude of the periodical waveform in response to the second periodical waveform to obtain an amplitude modulated waveform.

10. A method of correcting a deflection distortion according to claim 9, characterized in that the method of correcting the deflection distortion comprises the further steps of:

generating a sawtooth waveform from a horizontal position information;

controlling an amplitude of the sawtooth waveform in response to the control signal, having a value indicative of a repetition frequency of the position signal, to obtain an amplitude modulated sawtooth; and adding the amplitude modulated sawtooth to the amplitude modulated waveform.

11. A deflection correction circuit for correcting a deflection distortion of a picture tube, the correction circuit comprising:

means for generating a periodical waveform from a position signal, the periodical waveform having a repetition period comprising a scan period and a flyback period; and means for coupling the periodical waveform to a deflection yoke as a correction voltage to develop a correction current in the deflection yoke by an integration action of the deflection yoke;

characterized in that the means for generating the periodical waveform comprises:

means for generating a periodical block waveform comprising more than two successive levels during said scan period; and means for integrating the periodical block waveform into the periodical waveform comprising more than one straight line section each having a non-zero slope and a duration shorter than a duration of the scan period, wherein a starting point of a next straight line section coincides with an end point of a preceding straight line section, and wherein the periodical waveform comprises more than one straight line section during a scan period for obtaining the correction current comprising a chain of parabola sections during the scan period.

12. A deflection correction circuit according to claim 11 characterized in that the the repetition period is equal to a line period, and in that the correction circuit further comprises:

means for generating a second periodical waveform from a second position information, the second periodical waveform has a second period time equal to a field period; and means for controlling the amplitude of the first mentioned periodical waveform in response to the second periodical waveform to obtain an amplitude modulated waveform.

13. A picture display apparatus comprising:

a picture tube;

means for generating a deflection current in a deflection coil for deflecting at least one electron beam; and a deflection correction circuit for correcting a deflection distortion of said picture tube, the deflection correction circuit comprising:

means for generating a periodical waveform from a position signal, the periodical waveform having a repetition period comprising a scan period and a flyback period; and means for coupling the periodical waveform to the deflection coil as a correction voltage to develop a correction current in the deflection coil by an integration action of the deflection coil;

characterized in that the means for generating the periodical waveform comprises:

means for generating a periodical block waveform comprising more than two successive levels during said scan period; and means for integrating the periodical block waveform into the periodical waveform comprising more than one straight line section each having a non-zero slope and a duration shorter than a duration of the scan period, wherein a starting point of a next straight line section coincides with an end point of a preceding straight line section, and wherein the periodical waveform comprises more than one straight line section during a scan period for obtaining the correction current comprising a chain of parabola sections during the scan period.

* * * * *